Nov. 17, 1942.                G. W. HOSTETLER                 2,302,219
                        INFINITE PERIOD SEISMOMETER
                          Filed Sept. 15, 1941
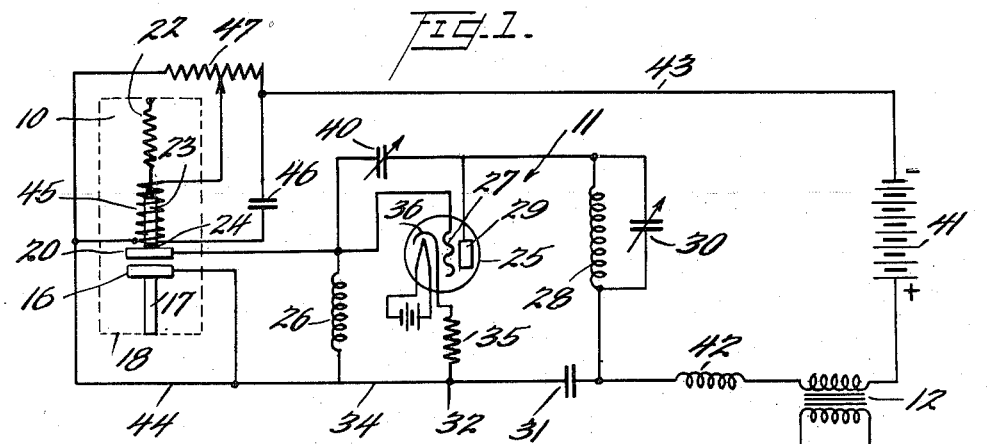
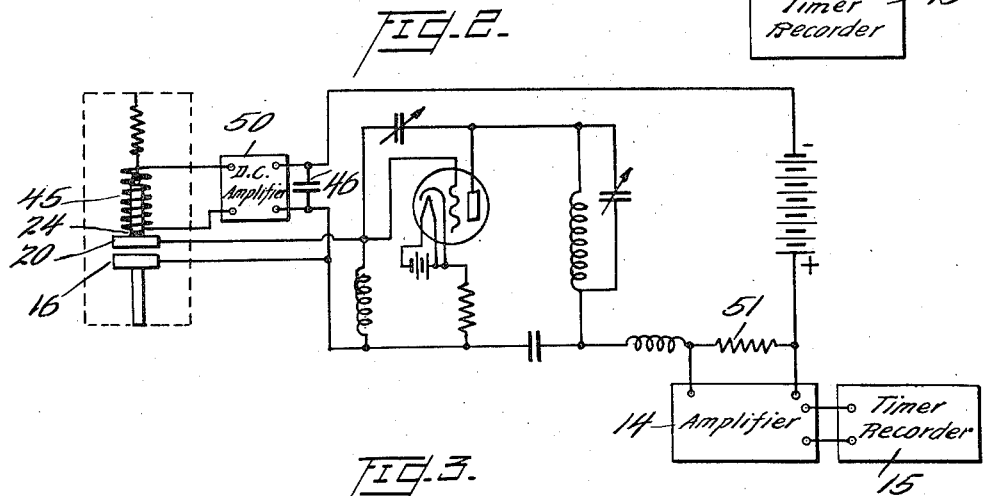
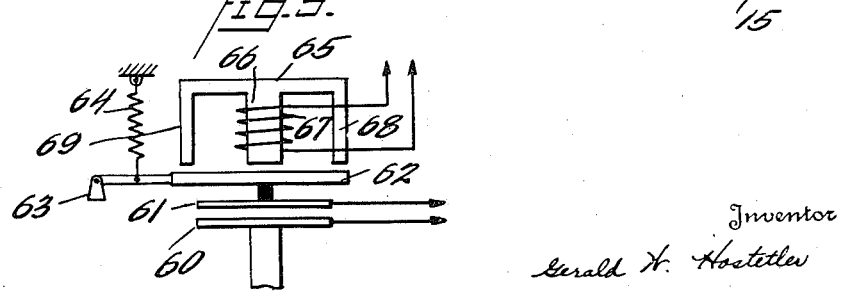
Inventor
Gerald W. Hostetler
By Watson, Cole, Grindle & Watson
                                        Attorney Patented Nov. 17, 1942

2,302,219

UNITED STATES PATENT OFFICE 2,302,219

INFINITE PERIOD SEISMOMETER

Gerald W. Hostetler, San Antonio, Tex., assignor to Olive S. Petty, San Antonio, Tex.

Application September 15, 1941, Serial No. 410,961

11 Claims. (Cl. 177—352)

This invention relates to seismometer systems and more particularly to seismometers and associated equipment adapted to provide such low frequency operation for seismometers of small size and portability that their operation may be considered astatic or substantially so.

It is a general object of the present invention to provide a seismometer system in which the moving element is so suspended and subjected to forces that its period may be infinite and the frequency zero.

It is a further object of the invention to provide an electro-mechanical seismometer working in conjunction with an electric circuit in such a manner that the latter feeds energy back to the former in accordance with relative movement between the parts of the seismometer to provide complete or partial astatic operation as desired.

An important object of the invention consists in providing a seismometer with a mass mounted for relative displacement responsive to earth movements and having suitable restoring forces cooperating with electro-magnetic forces, together with an electric circuit controllable by such displacements to regulate the current supplied to the electro-magnetic system whereby it acts in such a manner as to provide substantially zero total restoring force at any amplitude of displacement whereby operation may be substantially astatized.

Other and further objects and features of the invention will be more apparent to those skilled in the art upon a consideration of the accompanying drawing and following specification wherein are disclosed several exemplary embodiments of the invention with the understanding that such changes, modifications, and combinations of the same may be made as fall within the scope of the appended claims without departing from the spirit of the invention.

In said drawing:

Figure 1 is a schematic and diagrammatic showing of one form of the invention;

Figure 2 is a similar view of a second embodiment of the invention; and

Figure 3 is a fragmentary view on an enlarged scale of a modified form of electro-mechanical compensation for the seismometer moving part.

The field of seismology is generally divided into two main divisions, the first and oldest relating to the measuring and recording of natural earthquakes and associated phenomena, and the second to the measurement and recording of artificially created vibrations such as earth seisms generated by explosions or continuous vibrational energy generators and also the ordinary vibrations resulting from the operations of machinery and the like.

Natural earthquake shocks have very long periods and to properly record them, seismometers with even longer periods are desirable and have been constructed by the use of tremendous masses and long suspending means or their more complex mechanical equivalents for the so-called "steady mass," in relation to which the earth supported portion of the mechanism moves relatively under the stimulation of earth seisms. Such devices, however, are extremely ponderous and, in most cases, too sensitive and delicate for portable use.

In the field of geophysical prospecting by seismic surveying to which the present invention primarily pertains, portability is of extreme importance, sensitivity probably second in importance, and ruggedness next, although the factor of ruggedness is closely associated with portability. Artificial seisms as produced in the earth by an explosion of dynamite or the like or by similar means, are known to occur and travel largely in the range between 15 and 100 cycles per second, but they are normally detected and recorded with seismometers whose natural frequencies lie within this band or above it. If the frequency lies within the band, special means must be taken to damp the seismometer to prevent it from having excessive amplitude at its natural resonant frequency. However, in "refraction" type prospecting, where the chief interest is in the so-called "P" or primary waves, it is found that the energy thereof on the first portion of the cycle may be at or below a frequency of one cycle per second. The exact time of arrival of these waves is very important in this work.

The present invention contemplates the provision of a seismometer system for seismic surveying such, for instance, as used in geophysical prospecting, which complies with all the requirements of such a seismometer and yet will operate at a frequency below the range of vibrations to which it is normally subjected and all this without affecting its sensitivity in the least. The operation can be so adjusted that the frequency is substantially zero and the operation astatic without instability.

The mechanical units of the ideal seismometer, i. e., the base, case, or platform, and the suspended or steady mass, should be so constructed that the relative motion between the case and the suspended steady mass M will be identical to the motion of the earth at the seismometer with respect to an absolutely fixed point in space. In the usual seismometer, however, neglecting the effects of air or other frictional media between the case and the suspended mass, and particularly when the suspension includes a spring, the restoring force is in some manner a function of the displacement. Due to the application of this restoring force over a finite period of time, acceleration of the mass, however small, will take place and the mass M will develop relative motion to a fixed point in space. The expression "restoring force" as hereinafter used is considered to mean "any force or combination of forces which tends to return the steady mass to its normal position in repose after displacement thereof from this position."

In order to eliminate acceleration and consequent motion of the mass M, it is proposed in accordance with the present invention to incorporate with the seismometer means which will produce at any instant an exactly equal and opposite force on the mass from that produced by the restoring force. As an example, an electro-mechanical device may be used to produce this force such as a solenoid in which the pull on the armature is proportional to the deflection only and is independent of actual position of the armature with relation to the solenoid.

Thus the motion of M with respect to the fixed point may be greatly reduced or entirely eliminated so that relative motion of the case to the mass M will closely approximate true ground motion with respect to the fixed point in space.

This relative motion which corresponds to the actual displacement of the ground may, by the use of the proper means for converting it into electrical or other energy, be recorded to obtain exact displacement, velocity or acceleration records since there has been eliminated the responsivity of the mechanically vibrating system which normally affects the type of recording obtained.

In its simplest form, a system according to the present invention might be set up as shown in Figure 1 where the seismometer or mechanical-electrical transducer is represented at 10 and the electrical system controlled thereby at 11, while 12 indicates the output arrangement for the system adapted to apply energy controlled by the seismometer to a conventional seismic amplifier 14 delivering its amplified energy to a timer-recorder 15. These last two elements may be of any conventional type commonly used in seismic surveying work or of any other desired type.

The seismometer or transducer 10 may be of most any type as at present known and used such, for instance, as the variable capacity type, the variable reluctance type, the moving coil type, the piezo-electric type, etc., suitable modifications being made in the electric circuits to compensate for the type of electric energy output from the seismometer. It is merely required for proper operation according to the present invention that the relative displacement of the seismometer parts serves to "control the flow of current" in a circuit associated therewith. The expression "control the flow of current" applies equally as well to seismometers which generate current as to those which only vary a capacity, resistance, or inductance.

For the sake of simplicity there has been illustrated a so-called condenser type seismometer comprising a condenser plate 16 rigidly fixed by an electrically conducting post 17 to the housing 18 of the seismometer and adapted to move therewith to partake of the vibrations of the soil in which the seismometer is planted. A second and confronting condenser plate 20, which may be attached to a substantial mass to constitute the steady mass heretofore referred to; is supported in any well-known manner from the casing 18 as by the suspension coil spring 22 attached to the armature rod 23 extending upwardly from the plate. Insulation 24 is interposed between plate 20 and armature 23. It will be appreciated that earth vibrations transmitted to the case will move the plate 16 in respect to the plate 20 and vary the capacity of the condenser composed thereof. The spring supplies the supporting force for the steady mass to overcome the effects of gravity thereon and in addition, augmented or opposed by gravity provides restoring force upon displacement of the mass.

The variations in the capacity of the seismometer condenser 16, 20 may be made use of to vary the average anode current of an electronic valve 25 of conventional form, which is associated with oscillating circuit elements including the grid inductance 26 connected to the grid 27 of the valve and tuned by the condenser 16, 20. A plate or anode inductance 28 is connected to the plate 29 and shunted by a variable condenser 30 to form the plate tank circuit. The return from the tank is through the fixed condenser 31 to the point 32 to which the return from the grid inductance is connected by wire 34. A resistor 35 for self-biasing the grid connects the point 32 to the cathode 36 of the tube which is shown as of the separate heater type. A variable coupling condenser 40 provides adjustable feed-back between the tuned anode and the tuned grid circuits of the valve to regulate oscillation.

The anode is supplied with potential from the battery 41 through the radio frequency choke 42 and the tank inductance, the return from the battery being through wires 43 and 44 to the point 32. The desired output from the oscillator circuit may be taken off by the output transformer 12 as previously mentioned. Such an oscillator will oscillate at a steady fixed frequency in the supersonic range as long as all components of the circuit remain unchanged and will have a steady average anode current.

Part of the anode current flowing in the wires 43, 44 is passed through a solenoid 45 surrounding the armature 23 mechanically attached to the suspended plate 20 of the seismometer condenser. The coil 45 may be shunted by a fixed by-pass condenser 46 of low capacity. Preferably an adjustable potentiometer 47 is shunted about the solenoid to permit regulation of the proportion of anode current flowing therein.

The circuit arrangements above described, with the exception of the solenoid, provide a tuned plate, tuned grid oscillator with variable capacity feed-back that is entirely conventional. With obvious modifications it may be readily replaced by any similar so-called "micrometer" circuit such as shown in the application of Josephus O. Parr, Jr., and Gerald W. Hostetler, Serial No. 375,080, for Thermionic valve circuits, filed January 18, 1941, by that shown in Patent No. 1,431,638 to J. J. Dowling, etc. The valve shown is a triode but may be a tetrode, pentode, or any of the other types of tubes suitable for use in oscillator circuits, and the circuit may incorporate other modifications, as no novelty is intended in the oscillator circuit. The essential feature of the invention consists in feeding the plate current through the solenoid 45 which produces a magnetic field acting on the core 23 to apply force to the movable plate 20. Since the oscillator is normally adjusted to operate at supersonic frequencies, the radio frequency choke 42 excludes the oscillator frequencies from the inductance 45. The circuit including the coil 45 has a low enough impedance to pass the seismic or modulation frequencies to which the seismometer responds. The previously mentioned steady average anode current will now vary in accordance with the seismic modulations and will flow in the solenoid to determine its tractive force.

The oscillating circuit shown and those types referred to are so arranged that an increase in the capacity shunting the grid inductance 26 causes a decrease in the frequency of oscillation of the tube and a consequent decrease in the average anode current thereof, while the separation of the plates 16 and 20 causing a decrease in capacity causes an increase in the oscillation frequency and a consequent increase in the average anode current. This all results from setting the grid bias of the tube to preferably operate on the non-linear portion of the $E_g$—$I_p$ curve of the tube, for instance, near cut-off, so that applied changes in grid potential of equal value but opposite sign will change the plate current by unequal amounts.

It is well known that an open core solenoid at fixed voltage has a practically constant pull when its plunger is inserted more than 40% and less than 80% of its length and it is preferred that this arrangement be used in the present construction.

With the arrangement just described it will be seen that any movement which lifts the seismometer case brings the condenser plates 16 and 20 closer together, increases the capacity of the condenser, decreases the frequency of the oscillator, and decreases the average anode current which flows in the solenoid 45. At the same time the supporting spring 22 is stretched and additionally tensioned to provide a restoring force proportional to the displacement of the plate 20 in respect to the case. The spring is normally augmented in its support of the plate 20 and the attached armature 23 due to magnetization of coil 45 by the average anode current flow at the frequency of the oscillator occasioned by the repose setting of the condenser plates 16, 20. When the spring is thus additionally tensioned and provides restoring force, the reduced flow of current in the coil 45, resulting from the condenser plates becoming closer together, lowers the sustaining effort of the coil on the armature and, by proper initial adjustment of the amount of current in the coil, substantially eliminates the effect of the restoring force of the spring. With the restoring force of the resilient mounting system nearly counter-balanced, the natural period of the plate and armature constituting the steady mass of the seismometer will be increased.

When the seismometer case is lowered the plate spacing is increased, the capacity reduced and the current flow in coil 45 increased to compensate for the preponderance of gravity over the now reduced sustaining force resulting from shortening the spring.

It should be evident from the above that the operating frequency of the seismometer is independent of the frequency of oscillation of the electric circuit when the condenser plates 16, 20 are in repose.

Although it is well known that conditions giving an infinite period to any mechanical system border on instability, it is actually possible to attain zero frequency in this case without instability because of the slight losses in the magnetic system and the tendency of the same to generate currents opposing those already flowing in the coil, upon any movement of the armature. Of course, the natural frequency of the whole combination may be set as desired anywhere below the natural frequency of the mechanical system alone.

Since the seismometer is normally used to indicate or record motion, transfer of energy from the oscillating circuit to an indicating device through the amplifier 14 is provided for as previously mentioned. Since the value of the average anode current is an indication of the supersonic frequency of oscillation of the circuit, a recording of the changes in this frequency may be interpreted in terms of displacement of the seismometer parts.

If it is desired to have a seismometer which records velocity or acceleration, some other of the well-known electro-mechanical transducers, as the variable reluctance or moving coil types, might be used, with control over the current flowing to the seismometer solenoid in manners akin to that disclosed herein.

Because of the use of an open coil solenoid having the characteristic of practically constant pull at fixed voltage throughout a considerable range of movement, the oscillating circuit may be operated on the linear portion of its average-anode-current versus capacity curve where the capacity is that of the condenser 16, 20. In a great many cases this will have distinct advantages.

It is well known, however, that the open core solenoid plunger combination is productive of relatively low tractive forces and obviously the energy available from the magnetic system shown is not great. If it is desired to use this system, however, with a steady mass of considerable weight, additional energy may be provided as shown in Figure 2 by the introduction of a direct current amplifier 50 between the anode circuit and the coil 45 in the seismometer. The system of Figure 2 is otherwise identical with that of Figure 1 with the single exception that instead of the output transformer 12, an alternative system having a resistor 51 is used and the change of potential occurring across the terminals thereof is relied on to actuate the amplifier 14 for operating the timer-recorder 15. This arrangement, or with an inductance instead of the resistor 51, may be used interchangeably with the output transformer of Figure 1. The gain of the amplifier 50 may be adjusted to provide the desired opposition to or augmentation of the restoring force for the steady mass.

Since the open core solenoid plunger combination provides such low tractive forces, it may be replaced by the magnetic system shown in Figure 3 in which the fixed condenser plate is shown at 60 and the movable plate at 61 connected by any suitable means to, but insulated from, a flat magnetic armature plate 62. In this case the armature is shown fulcrumed at 63 and suspended by means of the helical spring 64. The magnet 65 is of the yoke type having the central core 66 supporting the winding 67 and either the separate poles 68 and 69 or a single cylindrical pole in which case 65 would be illustrative of a central section of the core. With this arrangement one additional variable is introduced into the system, for as the movable plate is displaced, the air gap in the magnetic system is changed, thereby causing a change in the forces acting on the movable plate. However, it is a simple matter to design the oscillating circuit so that over the necessary very small range of movement of the armature 62, and consequent change in capacity of the condenser 60, 61, the average-anode-current versus capacity curve will have such a configuration as to counteract the non-linear effect caused by the change in air gap of the electro-magnet with displacement of the movable condenser plate 61. While the system shown in Figures 1 and 2 is entirely practical by a proper choice of spring constants, there is a very definite advantage in using the closed field magnetic system shown in Figure 3, for ample tractive force may readily be obtained using the relatively small anode currents found in conventional micrometer circuits suitable to seismometer adaptation by virtue of their lightness, compactness, and/or low voltage requirements.

With the arrangements just described, it will be possible to obtain almost any fundamental seismometer operating frequency, varying from the natural frequency of the original mechanical system alone down to zero, by changes in the position of the core in the solenoid; changes in armature spacing from the magnet; changes in the oscillating circuit sensitivity (by any of the various methods such as shown in application Serial No. 375,080 above identified); by adjusting the gain control of amplifier 50; by a change or changes in the spring constant, or by any combination of the above so that a seismometer approaching astativity, or completely astatic, may be provided.

Having thus described the invention, what is claimed as new and desired to be secured by Letters Patent is:

1. An astatic seismometer system comprising, in combination, a recording means, a case, a steady mass, means supporting the mass from the case and providing restoring forces therefor proportional to displacements thereof relative to the case, an electric circuit for associating the seismometer with said recording means and having a steady average current flowing therein when the mass and case are relatively stationary, devices associated with the case and mass so constructed and arranged as to control the flow of said current in accordance with relative displacement of the mass and case, said recording means being adapted to record the instantaneous value of current in said circuit, and means responsive to said current adapted to neutralize the said restoring forces for all relative positions of the mass and case.

2. In a seismometer-recorder system, in combination, a seismometer having a mass adapted for movement relative to the case thereof, spring means suspending said mass and adapted to impart restoring forces thereto proportional to the displacement thereof relative to the case, a recorder, an amplifier for delivering current thereto, means associated with the mass and case arranged to control the flow of electric current to said amplifier in response to relative mass-case movement, and means actuated by said current to counteract said restoring forces.

3. In a seismometer system, in combination, a transducer including a sprung mass, a thermionic valve, an oscillating grid circuit for said valve including an impedance variable in response to displacement of said mass for altering the oscillation frequency, an anode tank circuit, a capacitive feed-back from the anode circuit to the said grid circuit, a shunt feed anode current supply, variations in the oscillation frequency of said circuit effecting a change in the average anode current, means creating a force responsive to said average current, and means to apply said force to oppose the restoration of said mass upon displacement thereof.

4. An astatic seismometer system comprising, in combination, a recording means, a case, a steady mass, means supporting the mass from the case and providing restoring forces therefor proportional to displacements thereof relative to the case, an electric circuit for associating the seismometer with said recording means, devices associated with the case and mass so constructed and arranged as to determine the flow of current in said circuit in accordance with the relative displacement of the mass and case, said recording means being adapted to record the changes in current in said circuit, and means responsive to said current changes adapted to neutralize said restoring forces.

5. In apparatus for converting mechanical vibratory impulses into wave-form electrical energy truly representative thereof, the combination with spaced condenser elements supported for relative vibratory movement in response to mechanical impulses, of a thermionic tube-driven oscillating electrical circuit including said elements, whereby the oscillating energy of said circuit is modulated by vibratory movement of said elements, and means responsive to the average anode current of the oscillating tube for automatically neutralizing the restoring force exerted as a result of relative displacement of the said condenser elements.

6. In a seismometer system, in combination, a case, a mass mounted for displacement relative to said case responsive to earth movements, spring means between the case and mass exerting suspending and restoring forces on said mass, an electromagnet augmenting said spring to suspend said mass, means to supply a current to said magnet, and means responsive to displacements of said mass to change said current so that the mass tends to remain in any relative position to which it is displaced.

7. An astatic seismometer system comprising, in combination, a recording means, a seismometer including a case and suspended steady mass, current controlling means associated with said case and mass and adjustable by relative movements of the case and mass, an electric circuit associating said seismometer means and recording means and adapted to be controlled thereby, means adapted to convert current to mechanical force and apply the same between said case and mass, and an amplifier between said last mentioned means and said controlled circuit.

8. In apparatus for converting mechanical vibratory impulses into wave-form electrical energy truly representative thereof, the combination with spaced condenser elements supported for relative vibratory movement in response to mechanical impulses, of a thermionic tube-driven oscillating electrical circuit including said elements, whereby the oscillating energy of said circuit is modulated by vibratory movement of said elements, a solenoid and plunger mounted to act between said condenser elements and arranged to provide substantially uniform tractive effort with fixed current throughout its range of movement, and means to supply said solenoid with current proportional to the average anode current of said tube, said solenoid and plunger being arranged so that their force substantially neutralizes the restoring force exerted by relative displacement of said condenser elements.

9. In apparatus for converting mechanical vibratory impulses into wave-form electrical energy truly representative thereof, the combination with a seismometer having a case and steady mass, means to suspend said mass and provide restoring forces proportional to relative displacements, means cooperating with said case and mass and including an electric circuit to control the flow of current in accordance with said displacements, an electro-magnet system acting between said case and mass, means to energize said magnet system in accordance with the current flow in said circuit, and means to regulate the pull of the magnet to always substantially neutralize said changeable restoring forces.

10. In apparatus for converting mechanical vibratory impulses into wave-form electrical energy truly representative thereof, the combination with a seismometer having a case and steady mass, means to suspend said mass and provide restoring forces proportional to relative displacements, means cooperating with said case and mass and including an electric circuit to control the flow of current in accordance with said displacements, an electro-magnet system acting between said case and mass, and having a variable air gap, means to energize said magnet in accordance with the flow of current in said circuit, and means controlling the variation of the current in said system in a manner to so energize the magnet as to provide substantial neutralization for the changeable restoring forces whereby the seismometer has astatic action.

11. The method of actuating a seismometer having a spring suspended steady mass comprising, controlling the flow of current in an electric system in accordance with the relative displacement of the seismometer parts and using at least a portion of said current to neutralize the restoring effort of the spring to thus astatize said seismometer.

GERALD W. HOSTETLER.